INVENTOR
GEORGE V. COLBY JR.

FIGURE 2

INVENTOR
GEORGE V. COLBY JR.

FIGURE 4

United States Patent Office 3,334,344
Patented Aug. 1, 1967

3,334,344
DOPPLER RADAR ALTIMETER
George V. Colby, Jr., Lexington, Mass., assignor to Laboratory for Electronics, Inc., Boston, Mass., a corporation of Delaware
Filed Sept. 20, 1965, Ser. No. 488,369
15 Claims. (Cl. 343—7.5)

ABSTRACT OF THE DISCLOSURE

A three-beam, interrupted continuous wave Doppler radar navigation system with an altimeter addition. The navigation system includes a base line computer which receives pulse rate signals proportional to Doppler velocity in three axes and digital signals proportional to pitch, roll and heading. The altimeter addition comprises a nulling servo which for altitudes above 2000 feet controls the pulse repetition frequency of the radar system while at altitudes below 2000 feet controls the phase of a constant pulse repetition frequency signal. The error signal required to produce the null is a measure of altitude.

Background of the invention

The present invention relates in general to electrical range measuring devices and in particular to a Doppler radar altimeter which enables a Doppler radar system to provide terrain clearance indications as well as other navigational information.

Various electrical altimeter systems have been devised to overcome the disadvantages of a conventional barometer which among other limitations provides only an indication of the height above sea level. Numerous of these systems operate on the echo ranging principle and use some type of modulation scheme for the transmitted energy signal. One electrical altitude indication system operates on a frequency modulated continuous wave (FM/CW) transmitted energy signal. The major problem encountered with this type of system is that the accuracy is marginal.

Another type of electrical range measuring device operates on an amplitude modulated continuous wave (AM/CW) transmitted energy signal. To operate properly, this device requires at least 100 db of isolation between the transmitter and receiver. This high degree of isolation can only be accomplished through the employment of separate transmitter and receiver antennas. Such an arrangement is bulky, expensive, and unwieldy from a size viewpoint.

Still another type of electrical range measuring system uses an interrupted continuous wave (ICW) transmitted signal wherein the transmitter and receiver are operated on a 50–50 duty cycle. That is to say, the transmitter and receiver are subject to a controlled gating action whereby the transmitter and receiver are rendered operative an equal duration of time but out of phase, so that the receiver and transmitter are on during mutually exclusive time periods. Since the round trip time of returned energy signals (time for the transmitted signal to travel to earth and return to the receiver) varies in direct proportion to the altitude, the pulse epetition frequency (PRF) of the system, which gates the transmitter and receiver on and off, is varied until a maximum returned signal is received. The PRF generator is controlled by an error signal developed through a phase comparison of the received signal envelope with the transmitted signal envelope. When the respective signals are 180° out of phase (received signal is centered between two transmitted signals), optimum PRF exist for that particular altitude. The error signal continually adjusts the PRF until such a condition exists. In this manner the PRF becomes an indication of the altitude. The operation of this device at high altitudes is excellent. However, at low altitudes when the round trip time of the transmitted signal is at a minimum a so-called altitude "hole" results. That is to say, since the PRF generator has a finite switching time it is unable to follow the rapid rate of the return energy signals at low altitudes. Thus an echo signal arrives at the receiver before it is rendered operative resulting in the loss of range information. To insure a return signal at all times the transmitter and receiver are purposely rendered operative during a small overlap time period. However, this results in the introduction of a large transmitted leakage signal into the received energy signal that renders the range information present in the return signal undetectable.

Accordingly, a primary object of the present invention is the provision of a single antenna Doppler radar altimeter capable of accurately measuring range from zero altitude to any desired maximum using one type of modulation for the transmitted signal over the entire range.

Another object of the present invention is to eliminate the undesired signal resulting from transmitter leakage.

Still a further object is the provision of an altitude indicator using a single antenna.

Another object of the present invention is the provision of a range maesuring apparatus which is compatible with existing Doppler radar systems and therefore easily adaptable thereto.

A further object is the provision of an altitude apparatus which is highly accurate at low as well as high altitudes.

A further object of the present invention is the provision of a closed loop phase sensitive circuit to derive range information.

Another object is the provision of an altimeter that eliminates transmitter leakage while still retaining the range information in the returned signal.

The altimeter of the present invention is designed for use in conjunction with Doppler radar systems. By this altimeter addition the Doppler radar system is capable of providing more extensive navigational information. In brief, the invention contemplates heterodyning the received energy signal with a local oscillator signal to produce a signal in the IF range. This resultant IF signal is simultaneously impressed upon the input of two separate mixers. In the first mixer the received energy signal is demodulated by beating the signal with the coherent carrier component of the transmitted signal translated down to an IF frequency to yield a signal containing a DC component due to leakage, and an audio component due to the desired signal. In the second mixer the received energy signal is demodulated by beating the signal with the coherent first upper side band of the transmitted energy signal shifted down to the IF range to yield a second signal containing a DC component due to leakage, and an audio component due to the desired signal. In both channels the DC term is rejected by filtering and the audio term is amplified. The two separate amplified audio signals are applied through a phase detector and integrator to yield a DC voltage indicative of the terrain clearance altitude. At altitudes above 2000 feet this DC voltage is applied to the input of a voltage controlled oscillator. The voltage controlled oscillator through a closed loop system controls the pulse repetition frequency of the Doppler radar system. The pulse repetition frequency is varied until a phase null results in the phase detector. In this manner the pulse repetition frequency is used as an indication of the terrain clearance altitude. At altitudes below approximately 2000 feet, since the PRF generator cannot be varied at the same rate as the echo signals return, the DC signal is used to control the phase of a variable phase shifter. By means of the phase shifter, the PRF signal is shifted in phase in accordance with the DC signal and the signal output of the phase shifter is applied over a closed loop system to produce a phase null in the phase detector. Appropriate circuitry senses the amount of variation required to produce the phase null and provides a signal indicative of altitude.

For a more complete understanding of the invention reference is now made to the following detailed description of a preferred embodiment of the invention and to the accompanying drawings in which.

Figure 1:
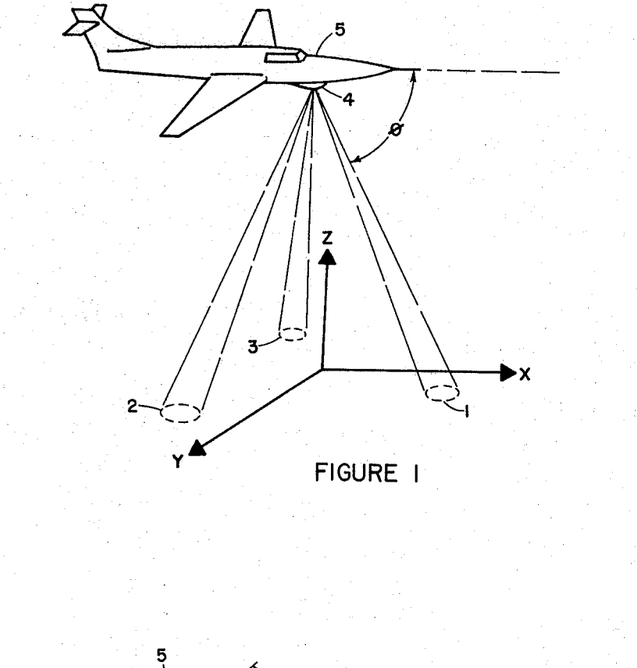
FIG. 1 illustrates a configuration of three microwave beams emanating from the under side of an aircraft.

With reference now to the drawings and in particular to FIG. 1 thereof, an aircraft 5 in level flight carries a radar apparatus for radiating a forward pencil beam 1, a rearward pencil beam 2, and a sidewise pencil beam 3. All of the beams are depressed at an angle $\phi$ which is the angle between a horizontal plane drawn through the axis of the aircraft and the direction of propagation of the pencil beam. The direction of heading of the aircraft is designated the X axis, vertical movement the Z axis and sidewise movement with respect to the heading direction is designated by the Y axis. A microwave lens 4 focuses energy from three separate feed horns into three pencil beams, and also focuses the return signal from each beam upon the respective horn from which it originated.

It is well known that relative motion between an aircraft and a reflecting object results in an apparent frequency or Doppler shift of the return energy signal with respect to the original transmitted signal. The Doppler frequency shift along each beam with respect to the aircraft, the roll and pitch of the aircraft, and the heading derived from a gyro compass or other suitable apparatus, in a computer to calculate the ground velocity, drift angle, vertical velocity and instantaneous position with respect to a fixed point of the aircraft. This return energy signal in addition to the above-mentioned functions can be utilized to obtain an altitude indication of the aircraft with respect to the reflecting terrain. The present invention is primarily concerned with the derivation of altitude information contained in the return energy signal.

Figure 2:
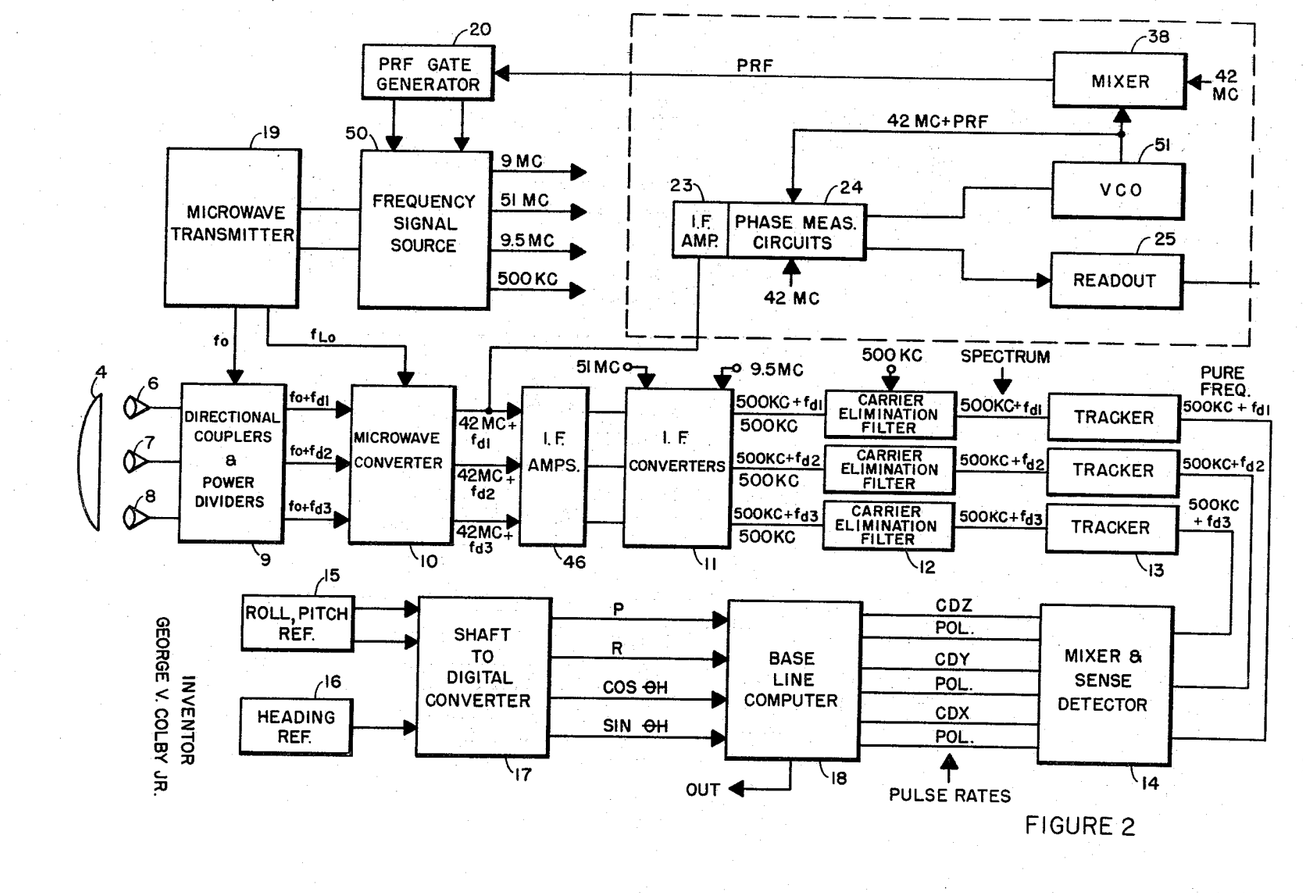
FIG. 2 illustrates in block diagram form the overall radar system with the altimeter addition of the present invention.

Turning now to FIG. 2, the altitude computation system of the present invention is shown enclosed in dotted lines while the relevant portion of the Doppler radar system with which it cooperates is illustrated outside the dotted lines. Microwave energy is radiated by conical horns 6, 7 and 8 and is focused into three pencil beams 1, 2 and 3, previously illustrated in FIG. 1. The conical horns 6, 7 and 8 are connected to the microwave transmitter 19 and microwave converter 10 through directional couplers and power dividers 9. Microwave transmitter 19 in turn is connected to PRF gate generator 20 through signal frequency source 50 which by means of a combination of harmonic generators and mixers of the type well known in the art generates coherently fixed frequency signals of 500 kc., 9.5 mc. and 51 mc. The advantages of utilizing coherently generated frequency signals throughout the radar system are discussed in detail in U.S. Patent No. 3,082,417 of M. A. Meyer, entitled Signal Selection System. In microwave transmitter 19 a microwave frequency derived from a stable microwave oscillator is sidestepped with the 9 mc. frequency signal and the 51 mc. frequency signal to produce a transmitted signal $f_o$ and a local oscillator signal ($f_{lo}$), respectively. By this sidestepping technique a fixed frequency difference between the generated signals is present at all times. That is to say, since both the transmitter and local oscillator signals are derived by combining the same stable microwave signal with one of the coherently generated signals, any drift in frequency of either the stable microwave source or the signal frequency source is followed by both the transmitter and local oscillator frequency signals so that an original fixed frequency difference is preserved. The transmitted signal of frequency $f_o$ and the local oscillator signal of frequency $f_{lo}$ are generated by microwave transmitter 19 during essentially mutually exclusive intervals in response to gating pulses from PRF gate generator 20 whose frequency in turn is controlled by the PRF signal derived from mixer 38. The signal outputs of microwave converter 10 are coupled to IF amplifiers 46. The frequency signal outputs of IF amplifiers 46 are coupled to IF converters 11 along with 51 mc. and 9.5 mc. frequency signals derived from frequency signal source 50. The IF converters produce output signals displaced in frequency from the input signals but retaining the Doppler shift characteristics. The latter signal outputs are impressed upon a plurality of trackers 13 after passing through carrier elimination filters 12. Each tracker 13 provides a single frequency output which is applied to the mixer and sense detectors 14 whose output in turn is applied to a base line computer 18. Trackers 13 and mixer and sense detectors 14 are preferably disclosed of the type in U.S. Patent No. 3,088,-109 of M. H. Meyer, entitled Signal Processing Apparatus, and assigned to the present assignee. Base line computer 18 receives additional information inputs from a roll and pitch analog pickup 15 and a heading analog pickup 16 through shaft to digital converters 17.

The altimeter addition of the present invention receives a signal input from the forward beam by way of one signal output line of microwave converter 10. This output line is connected to phase measuring circuits 24 through IF amplifier 23. Phase measuring circuits 24 are in turn connected to both readout device 25 and voltage controlled oscillator 51. The voltage controlled oscillator 51 produces a 42 mc.+PRF frequency signal that is fed mixer 38 which produces the PRF signal that in turn is fed to PRF gate generator 20.

Having described the overall system arrangement, the mode of operation will now be discussed. When PRF gate generator 20 renders microwave transmitter 19 operative an interrupted continuous wave transmitted signal $f_o$ is coupled through directional couplers and power dividers 9 to feed horns 6, 7 and 8. As previously discussed, microwave lens 4 focuses energy from the horns into three pencil beams 1, 2 and 3, illustrated in FIG. 1. The return energy signal from each beam is focused by lens 4 upon the respective horn from which it originated. Each return energy signal includes Doppler frequency shifts, designated as $f_{d1}$, $f_{d2}$, and $f_{d3}$ to correspond to the transmitted energy beams 1, 2, and 3. The three return energy signals $f_o+f_{d1}$, $f_o+f_{d2}$, and $f_o+f_{d3}$, respectively, are directed by directional couplers to microwave converter 10. In the microwave converter 10 the aforementioned three input signals are mixed with the local oscillator signal $f_{lo}$ derived from microwave transmitter 19 to provide signal outputs containing the Doppler frequency shifts translated to a 42 megacycle intermediate frequency.

Since the system operates with gated transmitter and local oscillator signals, the timing is so arranged that the local oscillator comes on slightly before the transmitter goes off. This overlap is inserted to insure a return signal at all altitudes, even at zero altitude. As a result of the overlap a strong 42 mc. IF leakage signal is present during the overlap period. This IF signal, resulting from imperfect duplexing between transmitter and receiver, may exceed the desired signal by as much as 100 db. The signal outputs of the microwave converter 10, comprising the down converted Doppler shifted return signals (the desired signals) and a 42 mc. leakage signal, are fed to the IF amplifiers 46 and also to the altimeter IF amplifier 23. In the IF converters the outputs of the IF amplifiers are double heterodyned down to a frequency in the vicinity of 500 kc. The leakage signal will be exactly coherent with the system 500 kc., while the desired signal will be at a frequency of 500 kc. plus the Doppler shift. These composite signals are fed to the carrier elimination filters 12. Each filter is preferably of the type described in Patent No. 2,909,656 of M. H. Meyer, entitled Selective Circuit, and assigned to the present assignee.

In carrier elimination filters 12 the IF signal outputs are mixed with a 500 kc. frequency signal to eliminate the above mentioned 500 kc. leakage signal when it appears. The carrier elimination filters 12 provide frequency shift spectrum outputs translated around 500 kc. signals to three trackers 13, simultaneously. In response to the Doppler frequency spectra inputs each tracker 13 provides a single frequency output signal which is characteristic of the average Doppler frequency shift present in the returned energy signals. These frequency tracker output signals are non-linearly combined in mixer and sense detectors 14 to provide three frequency pulse rate signal outputs indicative of the generalized Doppler variables $D_x$, $D_y$ and $D_z$, discussed in detail in the aforementioned U.S. Patent No. 3,088,109, entitled Signal Processing Apparatus, together with a polarity pulse accompanying each signal pulse train to designate the sense of the associated Doppler shift. A positive polarity pulse indicates that a Doppler frequency shift above a reference frequency while a negative pulse represents a Doppler frequency shift below the reference frequency. The signal output of one mixer and sense detector 14 are applied to base line computer 18 along with digital input signals representing roll, pitch and heading references. The latter digital input signals are derived from roll and pitch analog pickup 15 and heading analog pickup 16 after conversion to digital signals in shaft to digital converters 17. The various signal inputs are processed in base line computer 18 to supply horizontal and vertical ground speed, and drift angle information.

Turning now to the altimeter addition, after conversion to a 42 mc.-IF frequency signal a sample of the forward beam return energy signal which includes the Doppler frequency shift $f_{d1}$ is impressed upon the phase measuring circuits 24 through IF amplifier 23. Although for illustration purposes the forward energy beam is sampled, it is to be noted that any one of the energy beams can be used. In the phase measuring circuits the carrier component of the returned signal is mixed with its transmitted counterpart and the first upper sideband is mixed with its transmitted counterpart. The two resultant signal outputs derived from the above-mentioned signal comparisons are compared in a phase detector.

Prior to a detailed description of the preferred embodiment of the present invention, it is first appropriate to briefly discuss the fundamental principles involved in the operation of a pulsed radar altimeter system. The following analysis considers the nature of a radiated signal from a moving airborne object between the time it is transmitted and arrives back at the receiver. Also examined, is the signal characteristics during the process of retrieving the range information contained in the returned energy beam.

As is well known, the transmitted and received energy signals consist of a plurality of signals disposed about the carrier frequency and separated by intervals corresponding to the pulse repetition frequency. However, it can be shown that the sideband components other than the first upper and lower sidebands contribute a relative minor portion of the total power exhibited by the signal. Therefore, in the interest of simplicity, only the carrier, first upper and first lower sidebands of the signal are included in the present analysis. Each of the transmitted energy signals 1, 2 and 3 illustrated in FIG. 1 can be represented by the equation $$e_T(t) = E_c \cos(\omega_c t + \phi_c)$$
$$+ E_1 \cos[(\omega_c + \omega_p)t + \phi_c]$$
$$+ E_1 \cos[(\omega_c - \omega_p)t + \phi_c]$$

where $\omega_c$ is the frequency of the transmitted signal, $\omega_p$ is the pulse repetition frequency, $\phi_c$ is an arbitrary phase angle assigned to the carrier frequency and $E_c$ and $E_1$ are amplitudes of the carrier and first sideband components, respectively, of the transmitted signal. The reflected portion of the transmitted signal that arrives back at the receiver can be given by the form $$e_{ra}(t) = E_c^D \cos(\omega_c t + \phi_c + \alpha)$$
$$+ E_1^D \cos[(\omega_c + \omega_p)t + \phi_c + (\alpha + \beta)]$$
$$+ E_1^D \cos[(\omega_c - \omega_p)t + \phi_c + (\alpha - \beta)]$$

where $\alpha$ is the additional phase shift exhibited by the carrier component of the returned signal due to the round trip time of the transmitted energy signal, and $(\alpha + \beta)$, $(\alpha - \beta)$ are the additional phase shifts exhibited by the first upper and first lower sidebands, respectively, of the returned signal due to the round trip time of the transmitted energy signal.

Figure 3:
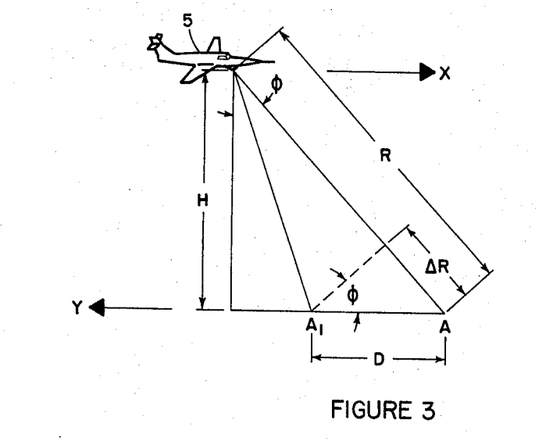
FIG. 3 is a diagram of the radar beam geometry.

Now, with reference to FIG. 3 an aircraft 5 is shown in level flight moving relative to the reflecting terrain in a direction indicated by a vector X. Point A designates the initial effective reflection point or bright spot of the transmitted energy beam 1 at a time $T_0$. In actual practice at any instant signals are reflected from a plurality of spots of the terrain that is illuminated by the energy beam, but, in the interest of simplicity, only one effective reflecting spot is shown. As discussed above at an initial time $T_0$ the received energy signal exhibits additional phase shift angles $\alpha$ and $\beta$ due to the round trip time interval of the transmitted signal. It can be shown that:

(1) $$\alpha = \omega_c \Delta T$$

where $\Delta T$ is the time interval for the transmitted signal to propagate from the transmitter to the reflecting terrain and back to the receiver. It is well known that:

(2) $$\Delta T = 2R/c$$

where R is the range between the aircraft and the effective reflection point A measured along the energy beam, and c is the propagation velocity of light. From an examination of the radar beam geometry illustrated in FIG. 2 it is apparent that:

(3) $$R = H/\cos \phi$$

where H is the altitude of the aircraft above the reflecting terrain, and $\phi$ is the angle between the radiated beam and a vertical line drawn from the aircraft to the terrain. Substitution of the value for R given in (3) into Equation 2 yields:

(4) $$\Delta T = \frac{2H}{c \cos \phi}$$

from which a combination of Equations 1 and 4 gives:

$$\alpha = \frac{\omega_c 2H}{c \cos \phi}$$

At some time later $T_1$ the aircraft has moved a distance D in the direction depicted by the vector X with respect to point A. It is obvious that this movement is the same as moving point A in the direction of vector Y with respect to the aircraft. For the purpose of illustration point A instead of the aircraft is assumed to be in motion so that the effective reflection spot for the transmitted energy beam changes to point $A_1$. The effect of the relative movement is to change the range distance R by a small increment $\Delta R$. At this instant in time ($T_1$) the form of the received energy signal is the same as previously described except that phase angles $\alpha$ and $\beta$ have varied due to the change in the range distance R. A further analysis of the radar beam geometry shows that:

(5) $$\Delta R = D \sin \phi$$

since $D=vt$, where $v$ is the relative velocity between the aircraft and the terrain, and $t$ is the time taken by the aircraft to move the distance D; Equation 5 can be expressed in the form:

(6) $$\Delta R = v + \sin \phi$$

Since a combination of Equations 1 and 2 shows that:

$$\alpha = \frac{2\omega_c R}{c}$$

It follows that the change in the phase angle $\alpha$ at time $T_1$ will be:

(7) $$\Delta \alpha = \frac{\omega_c 2 \Delta R}{c}$$

A substitution of Equation 6 into Equation 7 gives:

$$\Delta \alpha = \frac{2\omega_c v + \sin \phi}{c}$$

Thus the phase angle $\alpha$ of a single reradiator as it passes through the transmitted energy beam can be represented by:

(8) $$\alpha = \alpha_0 - \Delta \alpha = \frac{2\omega_c R}{c} - \frac{2\omega_c v + \sin \phi}{c}$$

A similar analysis shows the dynamic range of phase angle as the single reradiator passes through the transmitted energy beam to be:

(9) $$\beta = \frac{2\omega_D R}{c} - \frac{2\omega_D v + \sin \phi}{c}$$

It is obvious these Equations for $\alpha$ and $\beta$ hold only during the time interval point A is illuminated by the transmitted energy beam.

Turning now to the processing of the received signals to extract the range information contained in the phase difference between the carrier and first order sideband of the returned signal, the received signal carrier component is mixed with the transmitted carrier to obtain the following:

$$[E_c{}^D \cos (\omega_c t + \phi_c)] \cdot [E_c{}^D \cos (\omega_c t + \phi_c + \alpha)] \rightarrow K \cos \alpha$$

where K represents the amplitude of the resultant product.

If the upper sideband component of the received signal is mixed with the transmitted upper sideband, the following signal is obtained:

$$E_1 \cos [(\omega_c t \omega_p)t + \phi_c] \cdot E_1{}^D \cos [(\omega_c t \omega_p)t + \phi_c + (\alpha + \beta)] \rightarrow K \cos (\alpha + \beta)$$

where K represents the amplitude of the resultant product.

A comparison of the two signal products, which were obtained from the mixing processes, in a phase detector gives the following output signal:

$$[K \cos \alpha] \cdot [K \cos (\alpha + \beta)] \rightarrow K_1 \cos \beta$$

where $K_1$ represents the amplitude of the resultant product.

Substitution of the previously derived value of $\beta$ given in Equation 9 yields:

$$K_1 \cos \beta = K_1 \cos \left[ \frac{2\omega_D R}{c} - \frac{2v \sin \phi \omega_D t}{c} \right]$$

As is readily apparent the signal output of the phase detector contains an invariant time component proportional to range caused by the $$\frac{2\omega_D R}{c}$$

term and a time varying term $$\frac{2v \sin \phi \omega_D t}{c}$$

A comparison of the relative magnitudes of the respective terms in this final output signal shows that the time invariant term dominates the time varying term by a considerable amount. Hence the aforedescribed unique mixing process of the returned energy signal results in an output signal containing a prime term proportional to altitude.

Figure 4:
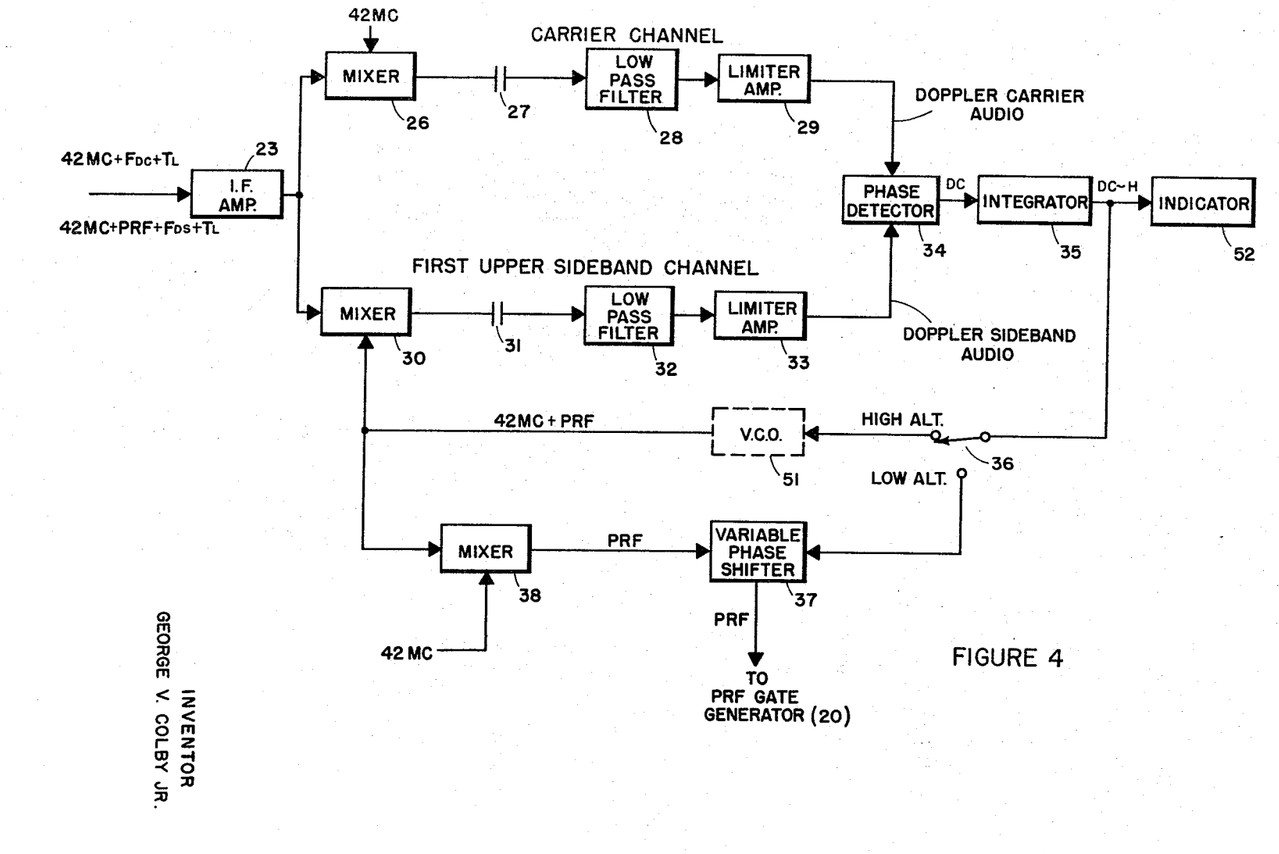
FIG. 4 is a more detailed diagram of the preferred embodiment of the altimeter addition.

The foregoing analysis facilitates a complete understanding of the functions achieved by the apparatus in the block diagram of FIGURE 4 which is an exemplary embodiment of a system responsive to a back scattered energy signal for providing an accurate indication of altitude.

With reference now to FIGURE 4, which is the altitude computation system shown broadly in FIGURE 2, a sample of the forward return energy beam after being shifted down to an IF frequency is fed through IF amplifier 23 and simultaneously applied to two parallel circuit channels, namely, a carrier channel and a first upper sideband channel. The carrier channel includes a mixer 26 energized by a 42 mc. signal derived from frequency signal source 50 The audio signal output of mixer 26 is connected to a low pass filter 28 through a capacitor 27. The low pass filter 28 is in turn connected to limiting amplifier 29. The first upper sideband channel is similar to the carrier channel in that it includes a mixer 30 energized by a 42 mc.+PRF frequency signal derived from a voltage controlled oscillator 51, a capacitor 31, a low pass filter 32 and a limiting amplifier 33. The signal outputs of limiting amplifier 29 and limiting amplifier 33, respectively, are applied to a common phase detector 34. The signal output of the phase detector 34 is in turn impressed upon integrator 35. At high altitudes the signal output of the integrator 35 is fed to the VCO 51 through a switching circuit 36. At low altitudes the signal output of integrator 35 is impressed upon the control input of the variable phase shifter 37 by means of switch 36. The variable phase shifter shifts the phase of the PRF signal from the mixer 38 and feeds it to the PRF gate generator 20.

Turning now to the operation of the system shown in FIG. 4, the sample of the forward beam return signal as it appears at the IF amplifier 23 contains not only the Doppler frequency shift signals associated with the frequency components of the transmitted signal but also, a transmitter leakage component $(T_1)$. This transmitter leakage signal, due primarily to imperfect duplexing techniques, must be eliminated or otherwise it swamps out the desired return signal. To reject this leakage signal while at the same time retaining the desired signal the composite signal from microwave converter 10 is amplified in IF amplifier 23 and simultaneously impressed upon the inputs of mixer 26 and mixer 30, respectively. Amplification of the composite signal in a single amplifier prior to any demodulation preserves the phase relationship among the various signals contained in the returned energy beam. In mixer 26 the composite signal is combined with a 42 mc. signal, which corresponds to the carrier component of the transmitted energy signal shifted down to an IF frequency, to provide a signal output that includes a Doppler carrier low frequency product in the audio range. It can be shown that this carrier low frequency product contains both a time invariant or DC component and a time variant component. The DC component results from the mixing of the transmitter leakage component with the 42 mc. IF signal. Capacitor 27 blocks the passage of this component and thus effectively eliminates the transmitter leakage from the signal. In low pass filter 28 all frequencies except the above identified Doppler carrier audio product resulting from the multiplication process in mixer 26 are filtered out. Thus by processing the signal output of mixer 26 through a capacitor and low pass filter combination, the signal as it appears at the output of low pass filter 28 contains only the time variant component of the identified Doppler carrier low frequency product from mixer 26. This latter signal is passed through limiting amplifier 29 which provides a constant amplitude output that is impressed upon one input of phase detector 34. At the same time the composite IF signal is being operated on in the carrier channel, it is also applied to mixer 30 located in the first upper sideband channel. In mixer 30 the signal is mixed with a 42 mc.+ PRF signal which corresponds to the first upper sideband of the transmitted signal shifted down to an IF frequency. As was the case in the signal product of mixer 26, the signal output of mixer 30 contains a single low frequency product in the audio range. This product is the Doppler sideband frequency signal and includes a DC or time invariant component and a time variant component. The DC component is a result of mixing the 42 mc.+ PRF signal with the transmitter leakage component contained in the IF input signal. The signal output of mixer 30 is AC coupled to low pass filter 32 by capacitor 31 to effectively eliminate the transmitter leakage (DC component) from the composite signal and fed through low pass filter 32 to filter out all frequencies except the Doppler sideband audio frequency product. At this stage the processed signal contains only the time varying component of the Doppler sideband frequency product of mixer 30. This signal is processed through a limiting amplifier 33 to a second input of phase detector 34. Phase detector 34 senses the phase difference between the input signals (Doppler carrier and Doppler sideband frequency signals) from the parallel circuit channels and provides a DC signal to the integrator 35. The DC output of integrator 35 is proportional to altitude when the closed loop is nulled (when the output of phase detector 34 is zero). Any one of numerous phase detectors and integrators can be used for this function. It is noted that the integrator can be either an all electronic type or an electromechanical type consisting of a servo amplifier, motor, potentiometer combination. At high altitudes, that is altitudes above approximately 2000 feet, switch 36 is set in a first position, as shown in FIG. 4, so that the DC output of phase detector 34 after passing through integrator 35 is fed directly to voltage controlled oscillator 51. By means of this signal the 42 mc.+ PRF signal and consequently the PRF signal of the radar system is varied in accordance with the DC signal output provided by phase detector 34. At this point it is to be noted that switch 36 may be mechanical or electrical and may be manually or automatically operated. When operating at high altitudes the 42 mc.+ PRF signal derived from voltage controlled oscillator 51 is applied directly to mixer 30. Since this frequency signal is varied by the DC signal derived from the phase detector 34, the signal output of mixer 30 is also continually changed. Accordingly, by way of the closed loop feedback path from phase detector 34 comprising the integrator 35, voltage controlled oscillator 51, mixer 30, and the other components located in the first upper sideband channel, the 42 mc.+ PRF frequency signal is varied in frequency until a phase null is produced in phase detector 34. In this manner, the PRF frequency signal, which is derived from the 42 mc.+ PRF frequency signal in mixer 38 has a half period which is equal to the round trip transit time, and therefore the PRF frequency is inversely related to altitude.

At low altitudes (below approximately 2000 feet) switch 36 is set to its second position so that the DC signal from integrator 35 is impressed upon the control input of variable phase shifter 37 instead of being fed to voltage controlled oscillator 51. In this mode of operation the 42 mc.+ PRF frequency signal produced by voltage controlled oscillator 51 is held constant. The PRF signal derived in mixer 38 is fed through the variable phase shifter 37 and is phase shifted by an amount controlled by the DC input signal from integrator 35. The phase of the PRF signal going to the PRF gate generator 20 is varied until a phase null exists at phase detector 34 output. Thus in the low altitude mode or operation a phase null is produced in phase detector 34 by varying the phase angle of the radar transmitter gate relative to corresponding phases at the mixer 38 output.

A direct readout of altitude is obtained by constructing the voltage controlled oscillator 51 in such a manner that its PRF frequency is inversely related to DC control voltage from integrator 35, and by constructing the variable phase shifter 37 in such a manner that the phase shift imparted to the PRF signal is linear with DC control voltage from integrator 35. Under these conditions the DC output of integrator 35 will be directly and linearly related to altitude when the closed loop is functioning and a phase null exists at phase detector 34. Since this is the normal condition during operation the DC signal from integrator 35 can be used as a direct linear indication of altitude, and fed to suitable indicator 52, computers, displays, telemetry equipment, or other device to display altitude information.

It is recognized by those skilled in the art that if the voltage controlled oscillator 51 or variable phase shifter 37 are not sufficiently linear or stable with respect to control voltage to provide the desired accuracy, the desired altitude information can still be extracted by utilizing circuits which essentially measure the PRF period (inverse of PRF frequency) and the phase difference between the input and output of variable phase shifter 37 and process this information according to the operating equation:

$$H = (\text{const})T(\phi/90°)$$

where:

$H$ = range being measured (altitude)
$T$ = PRF period (1/PRF)
$\phi$ = phase shift setting of variable phase shifter Simple analog computers capable of solving the equation can be readily incorporated into this altimeter system if required.

It will now be apparent to those skilled in the art that an important feature of the present invention is the feedback of the phase detector output signal to effect a phase null over the entire range of operation. At high altitudes the feedback path includes a voltage controlled oscillator while at low altitudes the feedback path includes a variable phase shifter which operates on a constant PRF frequency signal to effect the phase null. This closed loop processing of the phase detector signal output in conjunction with the unique mixing of the received energy signal in two parallel channels enables the radar altimeter of the present invention to measure range from the ground to great heights with an accuracy heretofore unattainable. In addition such a servo loop operation continually adjusts the PRF frequency of the radar system to an optimum value automatically for a given altitude to thereby enhance the overall performance of the entire radar system.

While the principles of the present invention have been described in connection with a specific embodiment, those skilled in the art may make numerous modifications to and departures from the specific embodiment described herein without departing from the disclosed inventive concepts. For example the specific frequencies and component arrangements have been used for illustrative purposes only. It is obvious to one skilled in the art that the system could utilize a CW local oscillator signal, if desired. It is also obvious that this system or a logical modification thereof could be operated without the Doppler radar system, so long as means for transmitting and receiving one beam were suitably provided, and therefore the invention can be utilized either as an altimeter addition to a Doppler radar or as an independent altimeter.

Furthermore it is obvious to one skilled in the art that a system of this type is not restricted to use in an aircraft, but can be used to measure range between any two points which are in relative motion with respect to each other. It is also possible to provide such relative motion by use of electronic or mechanical means, and consequently this system could be used to measure range between two cooperative points fixed in space. Consequently the invention is to be construed as limited only by the spirit and scope of the appended claims.

What is claimed is:

1. A system for measuring the distance between two relative moving objects comprising:
   (a) means including an antenna at one of said objects for transmitting a wave energy signal, said energy signal including at least two different frequency components;
   (b) means including said antenna to receive the transmitted signal after reflection from the other of said objects;
   (c) means to mix the received signal with one frequency component of the transmitted signal to produce a first output signal;
   (d) means to mix the received signal with a second frequency component of the transmitted signal to produce a second output signal;
   (e) phase sensitive means for generating a third output signal as a function of the phase difference between said first and second output signals;
   (f) means responsive to said third output signal to vary the relative phase of said first and second output signals so as to produce a predetermined phase relationship between said first and second output signals as sensed by said phase sensitive means; and
   (g) means to indicate the amount of variation required to produce said predetermined phase relationship, said indication being a measure of the distance between said objects.

2. A system as defined in claim 1 wherein the means to vary the relative phase of said first and second output signals includes a variable frequency generator.

3. A system for measuring the distance between two relative moving objects comprising:
   (a) means at one of said objects for transmitting a wave energy signal, said energy signal including at least two different frequency components;
   (b) means to receive the transmitted signal after reflection from the other of said objects;
   (c) means to mix the received signal with one frequency component of the transmitted signal to produce a first output signal;
   (d) means to mix the received signal with a second frequency component of the transmitted signal to produce a second output signal;
   (e) phase sensitive means for generating a third output signal as a function of the phase difference between said first and second output signals;
   (f) means including a variable phase shifter responsive to said third output signal to vary the relative phase of said first and second output signals so as to produce a predetermined phase relationship between said first and second output siganls as sensed by said phase sensitive means; and
   (g) means to indicate the amount of variation required to produce said predetermined phase relationship, said indication being a measure of the distance between said objects.

4. A system for measuring the distance between two relative moving objects comprising:
   (a) means at one of said objects for transmitting a signal toward the other of said objects, said signal including at least first and second frequency components;
   (b) means to receive the transmitted signal after reflection from the other of said objects; the received signal including at least two Doppler frequency shifted components;
   (c) circuit means to convert the received signal to an intermediate frequency;
   (d) a first mixer coupled to the output of said circuit means to mix the down converted received signal with said first frequency component of the transmitted signal translated to an intermediate frequency to produce a first output signal which includes a first Doppler frequency component;
   (e) a second mixer coupled to the output of said circuit means to mix the down converted received energy signal with said second frequency component of the transmitted signal translated to an intermediate frequency to produce a second output signal which includes a second Doppler frequency component;
   (f) first and second filters;
   (g) said first filter connected to the output of said first mixer and said second filter connected to the output of said second mixer to extract the first and second Doppler frequency components from said first and second output signals;
   (h) phase sensitive means coupled to the output of said first and second filters for providing a third output signal as a function of the phase difference between the Doppler frequency components extracted from said first and second filters;
   (i) means responsive to said third signal output to vary the phase difference between said first and second signal outputs so as to produce a predetermined phase relationship between said Doppler frequency components; and,
   (j) means to indicate the amount of variation required to produce said predetermined phase relationship, said indication being a measure of the distance between said objects.

5. A system for measuring the distance between two relative moving objects comprising:
   (a) a transmitter at one object for radiating a signal toward said other object, said signal including two different frequency components;
   (b) receiver means to receive a composite signal which includes said transmitted signal after reflection from said other object and a transmitter leakage signal directly from said transmitter;
   (c) first means coupled to said receiver means to mix said composite signal with one frequency component of said transmitted signal to produce a first output signal;
   (d) second means coupled to said receiver means to mix said composite signal with a second frequency component of said transmitted signal to produce a second output signal;
   (e) said first and second output signals containing a transmitter leakage component;
   (f) means coupled to said first and second mixing means to eliminate said transmitter leakage component from said first and second output signals;
   (g) phase sensitive means coupled to said latter means to generate a third output signal as a function of the phase difference between said first and second output signals;
   (h) means responsive to said third output signal to vary the relative phase between said first and second output signals so as to produce a phase null in said phase sensitive means; and,
   (i) means to indicate the amount of variation required to produce said phase null, said amount of variation being a measure of the distance between said objects.

6. A system as claimed in claim 5 wherein said means to eliminate the transmitter leakage component comprises a reactive element.

7. A system as claimed in claim 6 wherein said reactive element comprises a capacitor.

8. A system for measuring the distance between two relative moving objects comprising:
(a) a transmitter located at one object for radiating an ICW signal toward the other object, said ICW signal including first and second frequency components;
(b) a receiver to receive said transmitted ICW signal after reflection from said other object;
(c) a converter for translating the received signal to an intermediate frequency signal;
(d) a first mixer coupled to the output of said converter to combine the translated received signal with one frequency component of the transmitted signal converted down to an intermediate frequency to produce a first output signal;
(e) a second mixer coupled to the output of said converter to combine the translated received signal with a second frequency component of the transmitted signal translated down to an intermediate frequency to produce a second output signal;
(f) a first filter coupled to the output of said first mixer for extracting the lowest frequency signal present in the first output signal;
(g) a second filter coupled to the output of said second mixer to extract the lowest frequency signal present in the second output signal;
(h) phase sensitive means coupled to said first and second filters for generating a third output signal proportional to the phase difference between said extracted low frequency signals; and,
(i) means responsive to the third output signal to vary the phase difference between said low frequency signals so as to produce a phase null in said phase sensitive means; and,
(j) means to indicate the amount of variance necessary to produce said phase null, said amount of variance being a measure of the distance between said objects.

9. A system for measuring the distance between two relative moving objects comprising:
(a) means at one object for transmitting a signal which includes at least two different frequency components;
(b) means to receive the transmitted signal after reflection from said other object;
(c) means for applying the received signal simultaneously to two parallel circuit channels, each channel containig a mixer, a capacitor, a low pass filter and a limiting amplifier;
(d) said received signal being combined with one frequency component of the transmitted signal by the mixer located in the first channel to produce a first output signal;
(e) said received signal being combined with a second frequency component of the transmitted signal by the mixer located in the second channel to produce a second output channel;
(f) a phase detector coupled to the outputs of said first and second channels for generating a third output signal as a function of the phase difference between said first and second output signal;
(g) a variable phase shifter at one input of which a constant frequency signal is applied;
(h) means for applying said third output signal to a second input of said variable phase shifter whereby the phase of said constant frequency signal is controlled by said third output signal;
(i) means responsive to the phase shifted constant frequency signal for varying the relative phases of said first and second signals until a phase null results in said phase detector; and
(j) and read out means to indicate the amount of phase variation necessary to produce the phase null, said amount of phase variation being a measure of the distance between said objects.

10. A distance measuring system as defined in claim 9 wherein said means to apply said third output signal to said variable phase shifter is a switch.

11. A system for determining the distance between two relative moving objects comprising:
(a) means at one of said objects for transmitting a signal, said signal including two different frequency components;
(b) receiver means to receive said transmitted signal after reflection from said other object;
(c) said latter means also receiving a transmitter leakage component directly from the transmitter;
(d) means to mix said received signal with one frequency component of said transmitted signal to produce a first output signal;
(e) means to mix said received signal with a second frequency component of said transmitted signal to produce a second output signal;
(f) means for operating on said first and second output signals to eliminate said transmitter leakage component from said first and second output signals;
(g) phase sensitive means coupled to said means to eliminate the transmitter leakage component for generating a third output signal as a function of the phase difference between said first and second output signals, said third output signal being a measure of distance between said objects.

12. A distance measuring system as defined in claim 11 wherein said means to eliminate said transmitter leakage component comprises a pair of capacitors.

13. A system for measuring the distance between two relative moving objects comprising:
(a) means at one of said objects for transmitting a signal toward said other object, said signal including two different frequency components;
(b) receiver circuit means to receive said transmitted signal after reflection from said other object, said received signal including a transmitter leakage component directly from the transmitter;
(c) means connected to said receiver circuit means to mix said received signal with one frequency component of said transmitted signal to produce a first output signal;
(d) means connected to said receiver circuit means to mix said received signal with a second frequency component of said transmitted signal to produce a second output signal;
(e) means to eliminate said transmitter leakage component from first and second output signals;
(f) phase sensitive means to generate a third output signal as a function of the phase difference between said first and second output signals;
(g) means responsive to said third output signal to vary the relative phase of said first and second output signals so as to produce a phase null in said phase sensitive means; and,
(h) means to indicate the amount of variation required to produce said phase null, said indication being a measure of the distance between said objects.

14. A system for measuring the distance between two relative moving objects comprising:
(a) means at one of said objects for transmitting a signal toward the other of said objects, said signal including at least first and second frequency components;
(b) means to receive the transmitted signal after reflection from the other of said objects;
(c) circuit means to convert the received signal to an intermediate frequency;
(d) a first mixer coupled to the output of said circuit means to mix the down converted received signal with said first frequency component of the transmitted signal translated to an intermediate frequency to produce a first output signal;

(e) a second mixer coupled to the output of said circuit means to mix the down converted received energy signal with said second frequency component translated to an intermediate frequency to produce a second output signal;

(f) phase sensitive means coupled to the output of said first and second mixers for generating a third output signal proportional to the phase difference between said first and second output signals;

(g) a switch having first and second positions connected to the output of said phase sensitive means; said switch being set in said first position at high altitudes and in said second position at low altitudes;

(h) a voltage controlled oscillator connected to the input of said first mixer and responsive to said third output signal when said switch is set in said first position to vary the phase difference between said first and second output signals so as to produce a phase null in said phase sensitive means;

(i) a variable phase shifter having a constant frequency signal at one input thereof and responsive to said third output signal when said switch is set in said second position to vary the phase of said constant frequency signal;

(j) means responsive to the phase shifted constant frequency signal for varying the relative phases of said first and second signals to produce a phase null in said phase detector;

(k) and, integrator means to provide an output indicative of the amount of variance to produce said phase null, said amount of variance being a measure of the distance between said objects.

15. A system for measuring the distance between two relative moving objects comprising: means at one object for transmitting a signal including at least two frequency components; receiver circuit means for detecting the transmitted signal after reflection from the other object, said latter means also receiving a transmitter leakage signal directly from the transmitter; the reflected signal including two Doppler frequency components; said receiver circuit means including means to extract the two Doppler frequency components from the reflected signal while substantially suppressing the transmitter leakage signal and phase sensing means responsive to said Doppler frequency components to provide an output signal as a function of the phase difference between said two Doppler frequency components; means responsive to said output signal to vary the phase relationship between said Doppler frequency components to produce a predetermined phase relationship between said components; and means coupled to said phase sensing means to indicate the amount of variation required to produce said predetermined phase relationship, said indication being a measure of the distance between the objects.

References Cited

UNITED STATES PATENTS 2,546,973 4/1951 Chatterjea et al. _____ 343—12 X
3,168,735 2/1965 Cartwright _________ 343—14 X RODNEY D. BENNETT, *Primary Examiner.*

C. L. WHITHAM, *Assistant Examiner.*